United States Patent [19]

Lockhart

[11] 4,303,362
[45] Dec. 1, 1981

[54] COIL WOUND SPACER

[75] Inventor: David A. Lockhart, Bartonville, Ill.

[73] Assignee: Caterpillar Tractor Co., Peoria, Ill.

[21] Appl. No.: 85,645

[22] PCT Filed: Apr. 23, 1979

[86] PCT No.: PCT/US79/00260
§ 371 Date: Apr. 23, 1979
§ 102(e) Date: Apr. 23, 1979

[87] PCT Pub. No.: WO80/02274
PCT Pub. Date: Oct. 30, 1980

[51] Int. Cl.³ ................ F16B 39/24; F16B 43/00
[52] U.S. Cl. ..................... 411/153; 123/195 C;
  220/327; 403/408; 411/544; 411/546
[58] Field of Search ............................ 151/38, 14 CS;
  85/50 AT, 50 R, 62, 32 CS, 64; 220/327, 328;
  123/195 C; 403/408, DIG. 3; 184/106; 52/573;
  267/166, 167, 169, 177; 411/153, 12, 544, 546

[56] References Cited
U.S. PATENT DOCUMENTS

| | | | |
|---|---|---|---|
| 1,808,817 | 6/1931 | Oldham | 151/34 X |
| 2,014,995 | 9/1935 | Washer | 151/36 |
| 3,183,762 | 5/1965 | Poupitch | 151/38 X |
| 3,313,599 | 4/1967 | Boon | 220/327 X |
| 3,399,269 | 8/1968 | Willox | 151/38 X |
| 3,880,041 | 4/1975 | Markowski | 85/32 CS X |
| 4,027,644 | 6/1977 | Timour | 123/195 C X |
| 4,113,398 | 9/1978 | Jordan | 403/408 X |
| 4,122,326 | 10/1978 | Mercier | 219/104 |
| 4,165,194 | 8/1979 | Flower | 151/14 CS X |

*Primary Examiner*—Ramon S. Britts
*Attorney, Agent, or Firm*—Richard F. Phillips

[57] ABSTRACT

Spacers are used where added bolt length is advantageous. Such spacers are usually one piece and are formed from tubing having a solid cylindrical wall which often splits or yields when stressed by highly torqued bolts. An improved spacer (10) is formed from wound coil (12) to form a spiral walled cylindrical body (20) having advantageous over prior spacers. Each spiral (14) includes a portion (26) which abuts each adjacent spiral (14) and a portion (30) which is free of such abutment.

5 Claims, 8 Drawing Figures

TORQUE vs. BOLT MICROSTRAIN

COIL WOUND SPACER

DESCRIPTION

1. Technical Field

This invention relates generally to screw-threaded fasteners and more particularly to washers or spacers used in connection therewith.

2. Background Art

During the construction of motor vehicles, bolts are used to secure parts together such as bolting an oil pan on the underside of an engine block and bolting a manifold to an engine.

Since engine components are exposed to heat and resulting thermal stresses, important considerations are given to parts bolted together and to the bolts used. For example, when adjacent engine components heat up, they expand and stress the bolts which extend through mating surfaces of the abutting components.

When bolts are torqued to tightly secure a manifold to an engine block, the bolt is torqued within known limits to stretch or pre-stress that bolt. If this were not done, then the repetitive heating and cooling of the manifold, block and bolts could cause the bolts to eventually be loosened to a point where there was no longer a satisfactory tight abutment between the manifold and block. Thus, pre-stressing the bolt in a cold condition to a point which allows further bolt stretch in a hot condition, and which does not overstress the bolt to a yield or even a failure point is preferred.

Under these conditions, bolts of increased length are advantageous since there is more material available to assume the stress. "Bolt stretch," as it is commonly referred to, is the capability of a bolt to axially expand without exceeding its elastic limit and thus yield or be permanently deformed. Therefore, using bolts of increased length enhances bolt stretch.

In the past, spacers have been employed to permit the use of bolts of increased length where shorter bolts would otherwise be more appropriate. Such spacers are generally cylindrical and elongated, similar to a stack of flat washers formed into a solid wall cylindrical member.

A problem with such spacers is that, since they are usually formed from tubing stock, they have a tendency to be stiff and to split or yield when stressed due to such stock having seams, stringers or inclusions. To avoid this problem, thicker solid wall spacers have been used but this increases cost and adds some weight to the vehicle.

Another problem occurs when such spacers are inserted through molded organic plastic parts. The plastic parts, such as synthetic sound suppression panels used around engines and oil pans, etc., also attached to the engine with bolts, cannot withstand highly torqued bolts, otherwise the synthetic parts will crack and split.

The spacers are inserted to relieve the plastic part of high torque loads placed on the bolts. However, the spacers generally have smooth outer cylindrical walls which eventually become loose relative to the plastic part.

In view of the above, it would be advantageous to provide an improved spacer which overcomes the problems associated with the prior art.

DISCLOSURE OF INVENTION

In one aspect of the present invention, the problems pertaining to the known prior art, as set forth above, are advantageously avoided by the present invention.

This is accomplished by providing a coil wound spacer including a spiral wall cylindrical body having inner and outer annular surfaces. Each spiral includes a first portion which abuts each adjacent spiral and a second portion which is free of such abutment. The first portion is adjacent the inner surface and the second portion is adjacent the outer surface.

The foregoing and other advantages will become apparent from the following detailed description of the invention when considered in conjunction with the accompanying drawings. It is to be expressly understood, however, that the drawings are not intended as a definition of the invention but are for the purpose of illustration only.

BEST MODE FOR CARRYING OUT THE INVENTION

Figure 4:
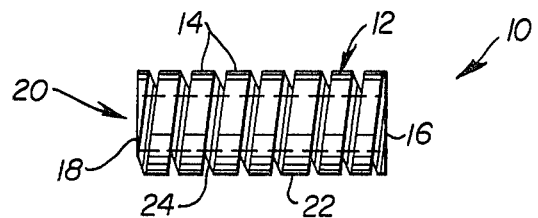
FIG. 4 is a side elevational view illustrating the coil wound spacer of this invention.

A spacer, FIG. 4, is generally designated 10 and is formed of spiral wound coil 12 to form a cylindrical body 20. Preferably, coil 12 is formed of either square or rectangular stock and is made as a helical torsion spring with each spiral or winding 14 of coil 12 abutting each adjacent winding. Opposite ends 16,18 are ground flat.

During winding of coil 12, greater stress occurs at the outer surface 22 of body 20 and, as a result, the thickness of coil 12 is reduced at outer surface 22. Thus, a spiral groove 24 is formed in outer surface 22 and extends from first end 16 to opposite second end 18 functioning as a means for limiting abutment between each adjacent spiral 14.

The thickness reduction of outer surface 22 causes a partial abutment between adjacent spirals 14. That is, a first portion 26 of each spiral 14 abuts each adjacent spiral at inside surface 28 and a second portion 30 of each spiral 14, formed by groove 24, is free of abutment with each adjacent spiral 14 (see FIG. 8). The first portion 26 of each spiral 14 abuts each adjacent spiral 14 to form, in cross section, a line of abutment or contact rather than merely a point of contact. In three dimensions, this abutment defines a surface rather than merely a helical line. This surface abutment is clearly shown in FIG. 8.

A spacer formed as described above includes a basic torsion spring function, that is, storage and release of energy due to torsional deflection. However, spacer 10, due to partial abutment between spirals 14 provides a solid height designated "h" similar to that of a solid wall spacer, but exhibits spring-like deflective qualities through twisting or torsional loadings. Also, a spacer thus formed includes a continuous spiral abutment surface 32 (FIG. 8) extending from first end 16 to second end 18 which functions as a means providing a continuous frictional surface between opposite ends 16,18.

Figure 2:
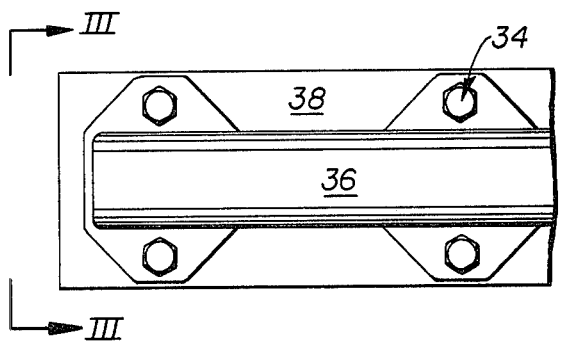
FIG. 2 is a partial plan view illustrating a manifold bolted to an engine.
Figure 3:
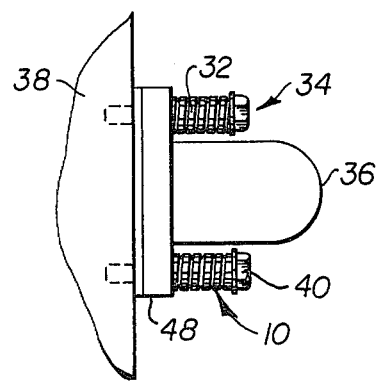
FIG. 3 is a partial side elevational view taken along the lines III—III of FIG. 2.

Spacer 10 (FIGS. 2 and 3) may be used in combination with bolt 34 for retaining a member such as a manifold 36 bolted to a receptacle such as an engine 38 of vehicle 39. In this instance, spacer 10 is compressed between bolt head 40 and receptacle 38. If desired, a washer 55 may be used in connection with bolt head 40 to enhance load distribution. Thus, spiral abutment surface 32 provides a continuous frictional surface interconnecting bolt head 40 and receptacle 38 via a flange 48.

Figure 1:
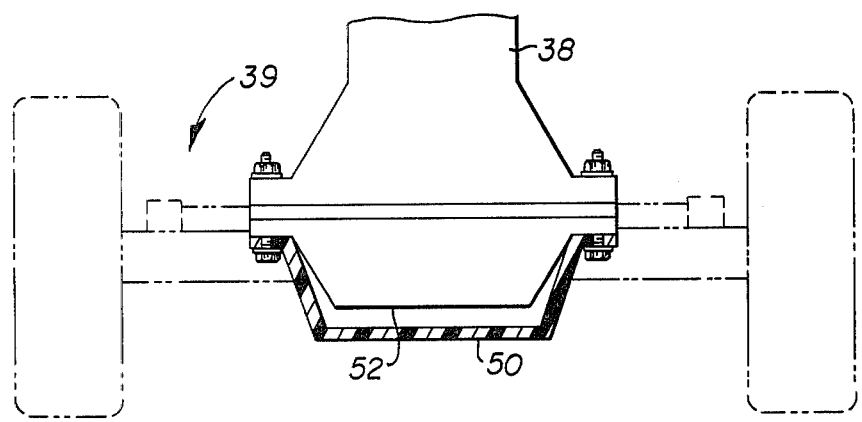
FIG. 1 is a graphic view illustrating a portion of a vehicle including a synthetic oil pan cover bolted to an engine.
Figure 6:
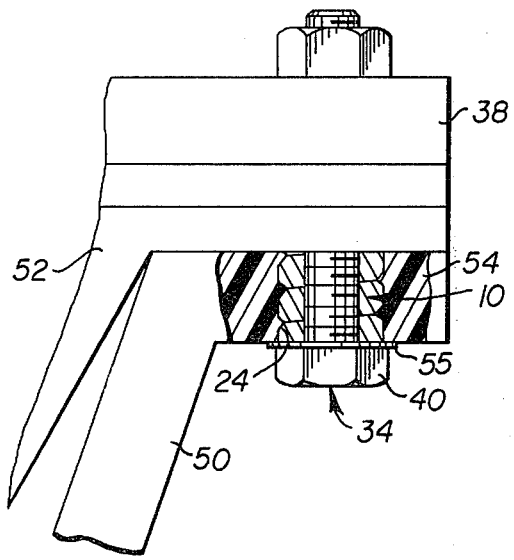
FIG. 6 is a side elevational view in partial cross-section illustrating a spacer in a synthetic material member bolted to a metallic material member.

FIGS. 1 and 6 illustrate bolt 34 in combination with a synthetic material member such as an organic plastic cover 50 for an oil pan 52 bolted to engine 38. Spacer 10 extends through cover 50 and is compressed between bolt head 40 and oil pan 52 which may be metal or organic plastic as is well known. As best shown in FIG. 6, the synthetic material 54 of cover 50 extends into groove 24 and thus aids in mechanical retention of spacer 10 within cover 50.

Figure 5:
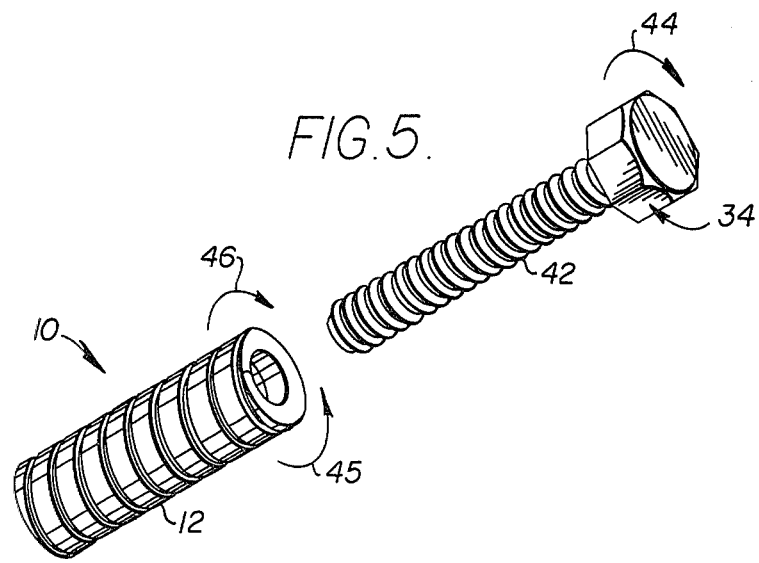
FIG. 5 is an isometric view illustrating a bolt and spacer in accordance with this invention.
Figure 7:
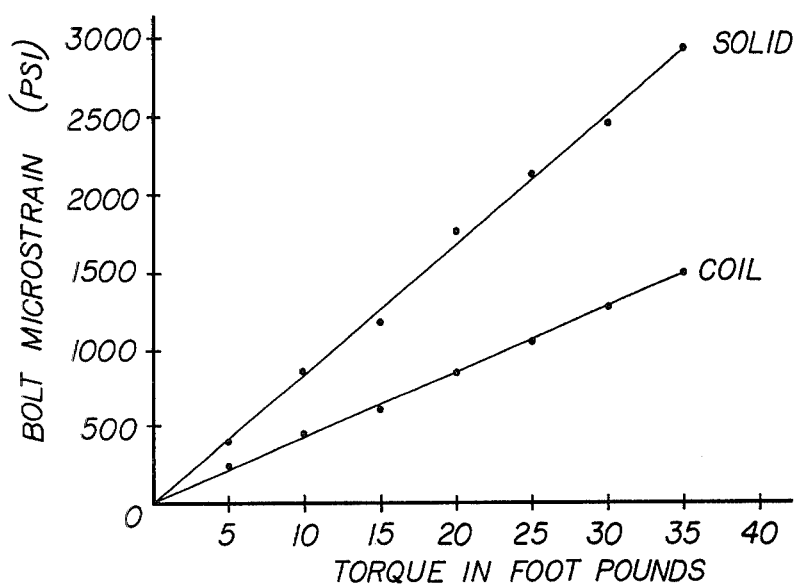
FIG. 7 is a graph illustrating test results comparing bolt torque in foot pounds vs. bolt microstrain between a solid spacer and a spiral spacer.

FIG. 5 illustrates bolt 34 including a clockwise spiral or right-hand thread 42 and spacer 10 including a left-hand or counterclockwise spiral or coil 12 indicated by arrow designated 45. Thus, it can be seen that tightening bolt 34 in a clockwise direction indicated by an arrow designated 44 will tend to torsionally wind coil 12 in a similar direction indicated by an arrow designated 46. It is shown in FIG. 7 that coil spacer 10, due to its ability to torsionally wind, is less stiff than previously known solid spacers. For example, the following table is based on test results illustrated in FIG. 7, comparing torque (in foot pounds) applied to a $\frac{3}{8}$" bolt and spacer versus bolt microstrain in pounds per square inch.

EXAMPLE

| Torque | Bolt Microstrain (psi) | |
| (foot pounds) | Coil | Solid |
| --- | --- | --- |
| 5 | 250 | 650 |
| 10 | 470 | 800 |
| 15 | 600 | 1160 |
| 20 | 820 | 1720 |
| 25 | 1020 | 2120 |
| 30 | 1240 | 2450 |

Based on the foregoing, it is believed that some of the clockwise torque applied to the bolt 34 is assumed by the clockwise torsional winding tendency of spacer 10 due to thread 42 and coil 12 being in opposite spiral directions as illustrated in FIG. 5. As a result of the ability of spacer 10 to torsionally wind, the spacer is less stiff than conventional spacers and less strain is experienced by bolt 34. Once torqued to a desired amount, it is believed that the stored energy in torqued coil 12 induces tensile stress on bolt 34.

INDUSTRIAL APPLICABILITY

Figure 8:
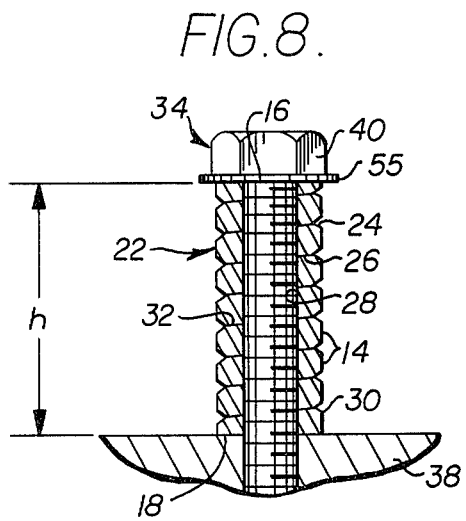
FIG. 8 is a side elevational view in partial cross-section illustrating a coil spacer compressed between a bolt head and a receptacle.

Bolt 34 is threaded into a receptacle 38 and spacer 10 is compressed between bolt head 40 and receptacle 38, FIG. 8. A first portion 26 of each spiral 14 abuts each adjacent spiral 14 adjacent inner surface 28 and a second portion 30 is free of such abutment adjacent outer surface 22 due to groove 24. Spiral abutment 32 extends from bolt head 40 at first spacer end 16 to receptacle 38 at second spacer end 18 to provide a continuous frictional surface when spacer 10 is compressed between bolt head 40 and another member such as receptacle 38 or the like.

The torsional flexibility of spacer 10 reduces spacer stiffness and bolt strain while continuous spiral surface 32 provides solid spacer height "h".

The foregoing has described a spacer formed from wound coil to form a spiral wall cylindrical body having abutting surfaces between adjacent coils.

Other aspects, objects and advantages of this invention can be obtained from a study of the drawings, the disclosure and the appended claims.

I claim:
1. A spacer (10) comprising:
   a spiral wound coil (12) having a cylindrical body (20), a substantially continuous annular inner surface (28), and an annular outer surface (22);
   a first portion (26) of each spiral (14) abutting in full surface abutment each adjacent spiral (14), said first portion (26), being adjacent said inner surface (28); and
   a second portion (30) of each spiral (14) being free of contact with each adjacent spiral (14), said second portion (30) being adjacent said outer surface (22).

2. An assembly comprising:
   a member formed of a synthetic material (54);
   a metallic member (52);
   a bolt (34) connecting the members (54,52) together;
   a spiral wound spacer (10) extending through said synthetic material (54) and being disposed between and contacting a head end (40) of an associated bolt (34) and said metallic member (52), said spacer (10) having spirals (14) being in abutment with each adjacent spiral (14), said spacer (10) having an outer cylindrical surface (22), a spiral groove (24) in said surface (22) receiving said synthetic material (54) and each spiral (14) of said spacer (10) extending in an opposed direction to threads (42) of said bolt (34).

3. In a connection having a bolt (34) threaded into a receptacle (38), the improvement comprising:
   a spiral wound spacer (10) having a spiral abutting condition, said spiral wound spacer (10) having spirals (14) each spiral (14) being substantially in surface abutment with each adjacent spiral (14) in response to said spacer (10) being in said spiral abutting condition, said spacer (10) being between a head (40) of said bolt (34) and said receptacle (38);
   means (32) providing a continuous surface interconnecting said bolt head (40) and said receptacle (38), said means (32) being a spiral abutment (32) between said adjacent coils (14) of said spacer (10); said spiral abutment (32) defining a spiral groove (24) each spiral (14) of said spacer (10) extending in an opposed direction to threads (42) of said bolt (34) and wherein said spirals (14) each have first surface (26) on the periphery thereof, said first surfaces (26) of abutting spirals (14) mating one with the other.

4. The assembly as set forth in claim 3 wherein said spacer (10) extends through a synthetic material (54), said spiral groove (24) receiving said synthetic material (54).

5. A spiral spacer (10) comprising at least two spirals (14), each spiral (14) having first surface portions (26) on the periphery thereof, said spacer (10) having a substantially continuous annular inner surface (28), said spacer (10) having a condition in which the first surface portions (26) of each spiral (14) are in full abutment with one of the first surface portions (26) of each abutting spiral (14), wherein each spiral (14) has second portions (26) adjacent an outer surface (22) of said spacer (10), said second portions (26) defining a spiral groove (24) in said outer surface (22).

* * * * *